Figure 1:
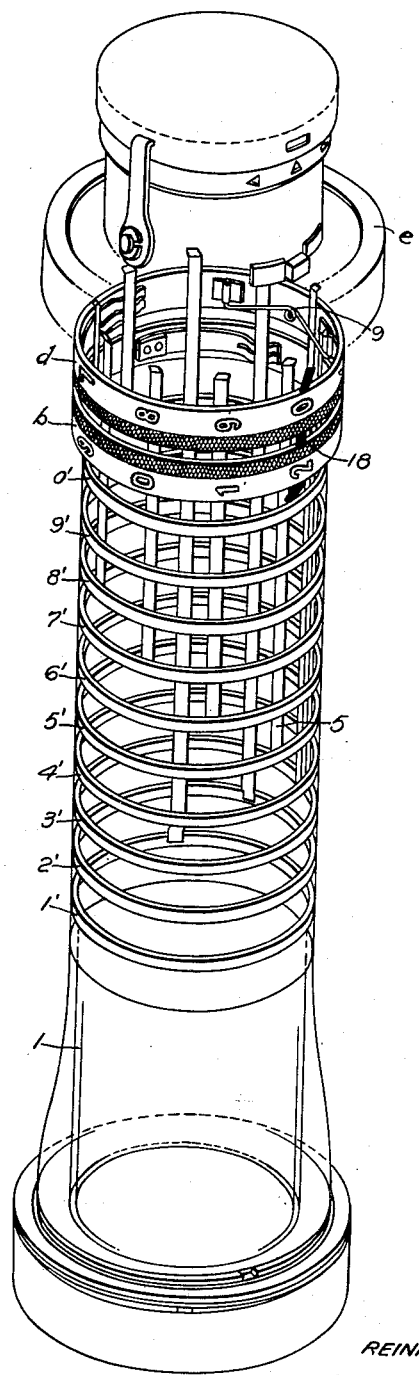

Jan. 26, 1954  R. GOERLICH  2,667,314
PNEUMATIC CARRIER
Filed April 23, 1952
4 Sheets-Sheet 2
*Fig.2*
*Fig.3*
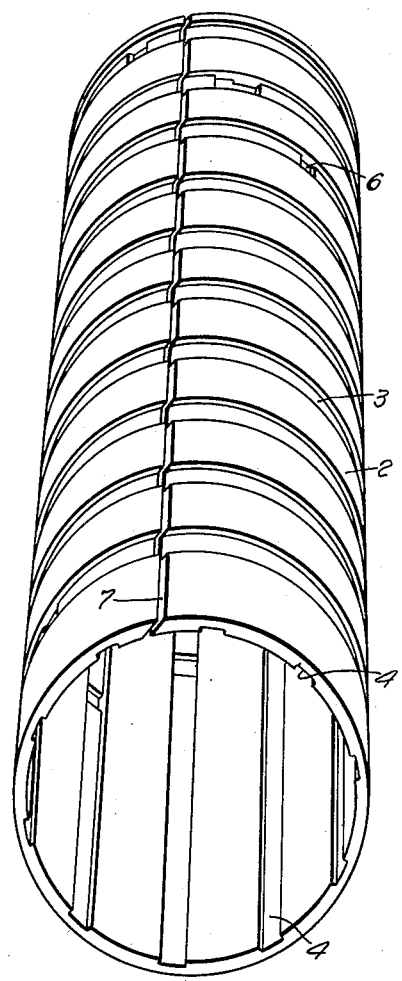
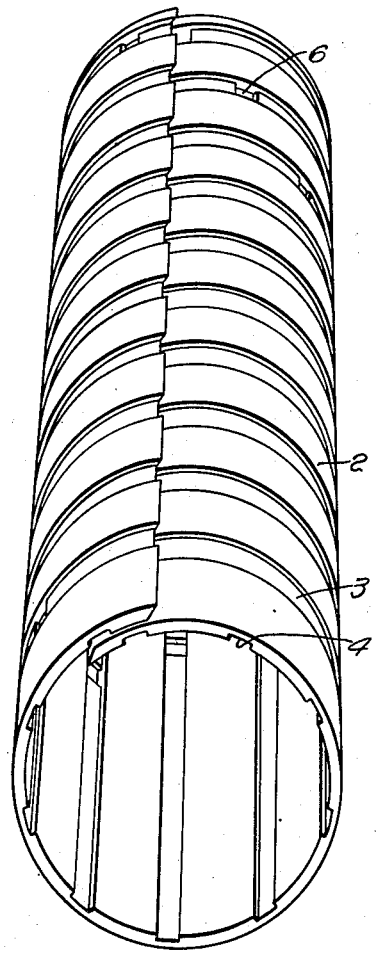
INVENTOR
*REINHARD GOERLICH*
BY
*Robert Harding Jr*
ATTORNEY Jan. 26, 1954

R. GOERLICH 2,667,314

PNEUMATIC CARRIER

Filed April 23, 1952

4 Sheets-Sheet 3

INVENTOR
REINHARD GOERLICH
BY
ATTORNEY

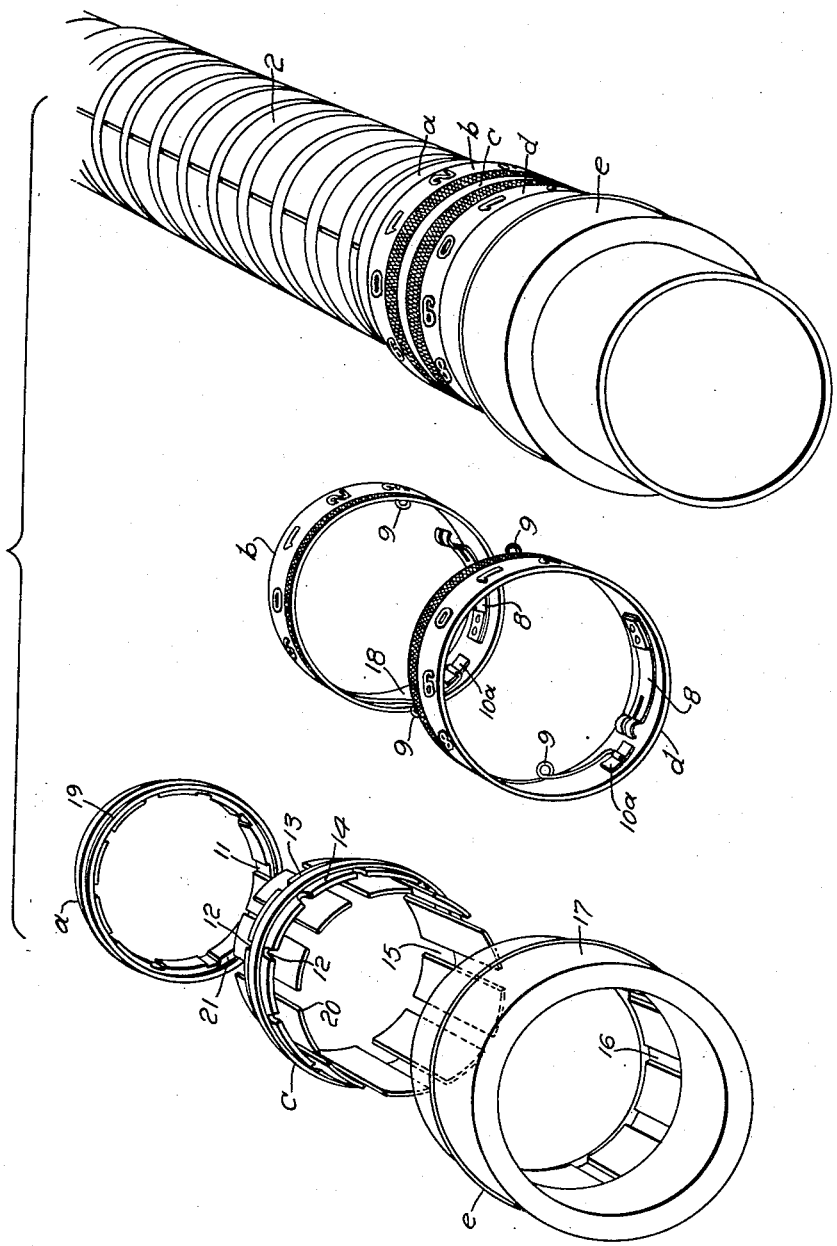
Jan. 26, 1954  R. GOERLICH  2,667,314
PNEUMATIC CARRIER
Filed April 23, 1952  4 Sheets-Sheet 4
INVENTOR
REINHARD GOERLICH
BY
ATTORNEY Patented Jan. 26, 1954

2,667,314

UNITED STATES PATENT OFFICE 2,667,314

PNEUMATIC CARRIER

Reinhard Goerlich, Berlin-Schoneberg, Germany, assignor to International Standard Electric Corporation, New York, N. Y., a corporation of Delaware Application April 23, 1952, Serial No. 283,860

Claims priority, application Germany April 28, 1951

5 Claims. (Cl. 243—35)

This invention relates to improvements in pneumatic carriers and particularly to pneumatic carriers having apparatus thereon capable of signalling a destination for such carriers.

To set the destination marking of automatically controlled pneumatic carriers it is known to provide the carrier with a set of ring contacts. Depending on the number of destinations the contact rings are used in conjunction with one or two setting rings so up to 10 or up to 100 destinations can be marked. The destination marking is effected by turning the setting rings, which, by means of a sheet-type contact spring, make contact with the wires or metal strips related to the individual contact rings so each setting ring is connected metallically with one contact ring at a time.

It is known that the outer diameter of a pneumatic carrier is determined by the radii of the tube curves and the useful length of the carrier. The contact and setting rings now cause a certain loss of potential loading space. To minimize these losses, efforts are made so to design the control means that they do not considerably increase the diameter of the tubular body of the carrier. This, however, meets with difficulties since the contact wires or strips for the contact rings have to be insulated from the carrier body and from each other. This results in a complicated setup of slip-on insulating and contact parts which require exact tolerances and cause difficult and thus expensive manufacturing methods.

The invention relates to the problem of eliminating or diminishing the aforementioned difficulties. In accordance with the invention this is achieved by the device that there is slipped on the tubular carrier body a cylindrical contact ring holder of a resilient insulating material which is slotted in a longitudinal direction, and which on its outer shell is grooved to receive the contact rings, while the inner wall is provided with longitudinal grooves to receive the contact strips.

In accordance with a further inventive idea, the resilient contact ring holder is provided with cutouts corresponding to the pitch of the longitudinal grooves, to thread in the contact strips firmly connected with the contact rings to form individual subassemblies.

The assembly of such a contact ring body is effected in accordance with a further inventive idea in a way that the resilient contact ring holder is reduced in diameter by pressure to allow sliding-on of the contact rings, and that the contact strips attached to the contact rings are threaded in succession through the cutouts and placed in the longitudinal grooves, and that once the contact rings and strips have been placed, the diameter of the contact ring holder is restored to its original size.

To insulate the tubular carrier body from the resilient contact ring holder, the tubular carrier body is wrapped in accordance with a further inventive idea with an insulating film which serves at the same time for equalizing the structural tolerances for the ready-mounted contact ring holder placed around the insulating film.

Figure 4:
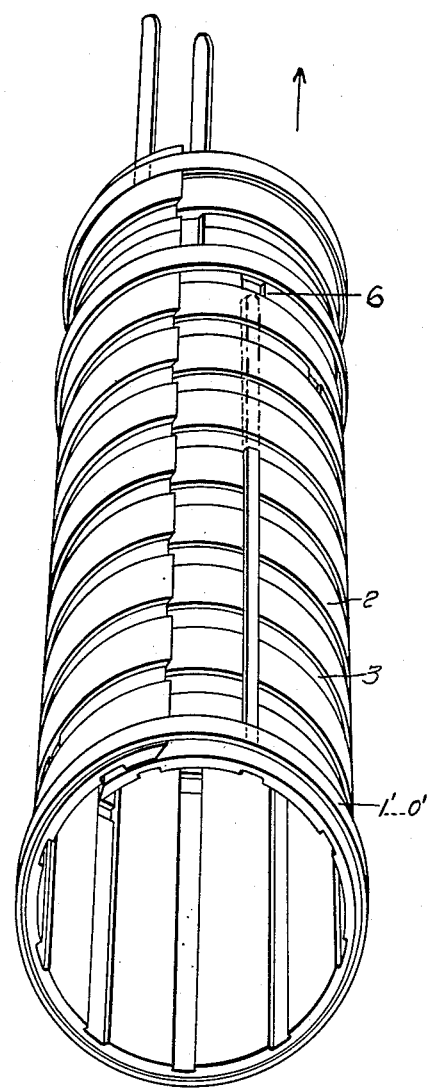
Figure 5:
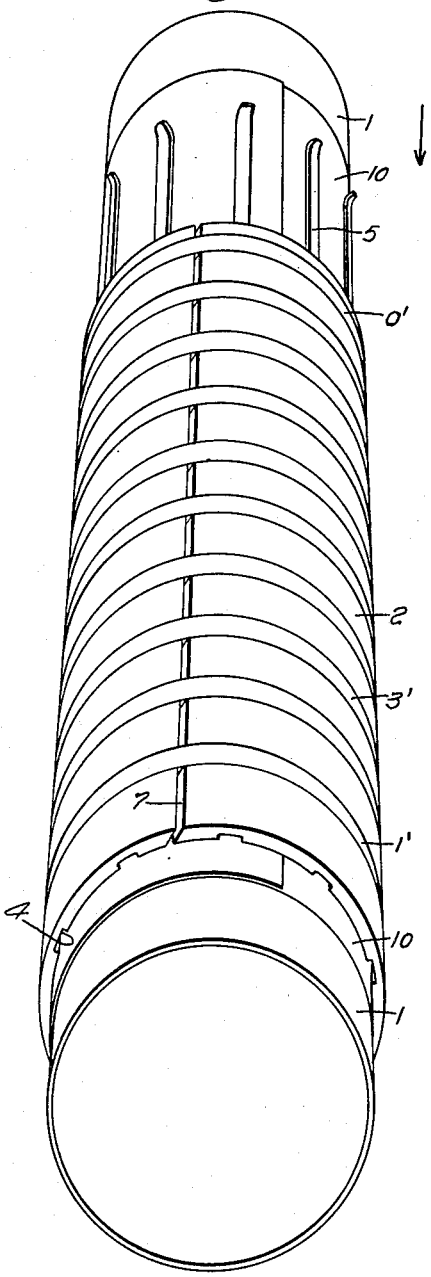

The invention will be described in the following with the help of the embodiment shown in the figures. There shown in a perspective view:

Fig. 1 a pneumatic carrier in which the contact rings with the contact strips and the setting rings are made visible by leaving away part of the tubular carrier body and the contact ring holder, Fig. 2 the resilient contact ring holder, Fig. 3 the contact ring holder somewhat compressed in its diameter, Fig. 4 the contact ring holder with the contact rings partially threaded in place, Fig. 5 the contact ring holder slipped on the tubular carrier body in a ready mounted state, Fig. 6 left to right: the individual rings of the setting device, the two numeral setting rings, the end of the pneumatic carrier mounted with setting and contact rings.

As is apparent from Fig. 1, the contact rings I' . . . 0' are tied firmly to their contact strips 5 by soldering or welding. Fig. 1 shows without the contact ring holder as it were the skeleton of the contact ring assembly comprising ten contact rings. In Fig. 2, the cylindrical contact ring carrier 2 is shown consisting of resilient insulating material, preferably synthetic rubber, which carrier is provided along its circumference with ten grooves 3 to accommodate the contact rings. In the inner wall of the cylinder there are arranged in a longitudinal direction ten equispaced grooves 4 which serve to accommodate the contact strips 5 of the contact rings. The obliquely-cut longitudinal gap 7 allows the cylinder to be compressed to a smaller diameter wherewith the adjoining edges of the gap overlap. There are further provided cutouts 6 in the cylinder in accordance with the circumferential pitch of the contact strips which serve to thread up the contact strips 5 when the contact rings I' . . . 0' are applied.

Fig. 3 shows the cylinder in a compressed state as required for positioning the contact rings 5. This slide-on procedure of the contact rings and the threading-up of the contact strips that goes with it, is apparent from Fig. 4. The first two contact rings have already been slipped on, and project with their ends out of the cylinder. The third ring has been placed at the front end of the cylinder and is now pushed onward in the direction of the arrow until the end of the contact band reaches its assigned cutout 6. In this position shown by the dot-and-dash lines, the contact band is threaded up through the cutout whereupon the contact ring is pushed on to its assigned ring groove.

When all of the contact rings have been pushed on in this manner, the fully mounted cylinder is slipped on the tubular carrier body 1 wrapped with the insulating film 10, as shown in Fig. 5. The insulating film not only serves to insulate the contact parts but equalizes any tolerances in the tubular carrier body that may be present so the spread-up contact ring holder 2 is firmly clamped in place.

One proceeds now to apply in the direction of the arrow indicated in Fig. 5 the parts of the setting device shown in Fig. 6. One begins by placing the insulating ring "a" above the free ends of the contact strips so the contact bands come to rest in the receiving grooves 11.

Next, the setting ring b is pushed in place and slipped on the insulating ring a. The inner wall 18 of the setting ring covers herewith the surface 19 of the insulating ring a.

As a next component, the insulating ring c is pushed in place, care being taken that the contact strips 5 lie in the grooves 15. The insulating ring c is pushed on until the parts 20 hit the surface 21 of the insulating ring "a." The setting ring b runs then on the surface 13 of the insulating ring c. The detent springs 9 held in the support eyes 10a of the setting ring b can then engage the detent holes 12 of the running surface 13. The double contact spring 8 of the setting ring touches then the respective contact strip 5 selected by turning the ring which completes a conductive connection between the contact and the setting rings.

As a next part, the second setting ring d is pushed in place which moves on the running face 14 of the insulating ring c and which with its detent springs engages the detent holes 12.

Finally, the terminal ring e with the felt-guiding ring 17 is slipped in place, again with consideration of the grooves 16 provided for the ends of the contact strips. The setting device is now mounted on the tubular carrier body as is apparent at the right of Fig. 8. At the end of the carrier, where the setting device is provided, there is a carrier locking mechanism which is in evidence in Fig. 1. The design of this locking mechanism is of no significance to the invention.

Alternatively, the resilient contact ring carrier 2 may also be assembled from individual shell sections similar to the staves of a barrel.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. Pneumatic tube carrier with a ring contact assembly for setting the destination marking of said carrier comprising a plurality of contact rings, each ring including a longitudinal contact strip having an end fixed to the inside of said ring and extending in a plane parallel to the axis of said ring, a resilient cylindrical contact ring holder of insulating material having on its outer surface a plurality of spaced, annular grooves disposed along the length thereof, having on its inner surface a plurality of spaced, longitudinal grooves and having a plurality of radially spaced apertures extending through the wall of said holder, each aperture in a different one of said outer grooves at a point bisected by a different one of said inner grooves, means for selectively interconnecting said strips, said holder having a longitudinal slot extending along the entire length thereof whereby the diameter of said outer grooves may be made temporarily smaller than the inside diameter of said rings until said rings are set in said outer grooves, the contact strip of each ring adapted to be inserted through the aperture associated with the outer groove in which said ring is set and to lie within one of said inner grooves.

2. Pneumatic tube carrier as claimed in claim 1, wherein said longitudinal slot is cut obliquely through the wall of said holder to enable the adjacent edges of said holder created by said slot to be overlapped during assembly of said contact rings.

3. Pneumatic tube carrier as claimed in claim 1, wherein said carrier further comprises a cylindrical carrier body and in insulating film wrapped therearound, said body and said film adapted to be coaxially fitted within said holder.

4. Pneumatic tube carrier as claimed in claim 1, wherein said contact strips are adapted to extend beyond an end of said holder.

5. Pneumatic tube carrier as claimed in claim 4, wherein said means for selectively electrically interconnecting said strips comprises a pair of rotatable contact rings each having a contact wiper attached to the inner surface thereof and a detent spring, a separating ring of insulating material, said ring having a plurality of annular rows of spaced detents radially disposed therearound, corresponding detents of each row associated with the same contact strip, each of the detent springs adapted to cooperate with the detents of respective of said rows, said separating ring and said contact rings adapted to be mounted over the extended ends of said strips, whereby the wipers of said contact rings are enabled to contact selected of said strips upon manual rotation of said rings.

REINHARD GOERLICH.

References Cited in the file of this patent

FOREIGN PATENTS

| Number | Country | Date |
|---|---|---|
| 751,897 | France | July 3, 1933 |
| 754,328 | France | Aug. 28, 1933 |
| 43,790 | France | June 11, 1934 |
| | (Addition to No. 751,897) | |